(12) United States Patent
Postovalov et al.

(10) Patent No.: US 8,947,527 B1
(45) Date of Patent: Feb. 3, 2015

(54) ZOOM ILLUMINATION SYSTEM

(76) Inventors: Valdis Postovalov, North Salt Lake, UT (US); Dmitry Postovalov, North Salt Lake, UT (US)

(*) Notice: Subject to any disclaimer, the term of this patent is extended or adjusted under 35 U.S.C. 154(b) by 404 days.

(21) Appl. No.: 13/427,438

(22) Filed: Mar. 22, 2012

Related U.S. Application Data

(60) Provisional application No. 61/471,003, filed on Apr. 1, 2011.

(51) Int. Cl.
*H04N 7/18* (2006.01)
*G08B 13/196* (2006.01)
*H04N 5/235* (2006.01)

(52) U.S. Cl.
CPC ............. *H04N 7/181* (2013.01); *H04N 7/183* (2013.01); *H04N 7/188* (2013.01); *G08B 13/19656* (2013.01); *H04N 5/235* (2013.01); *G08B 13/196* (2013.01)
USPC ........... 348/143; 348/142; 348/144; 348/145; 348/146; 348/147; 348/148; 348/149; 348/150; 348/151; 348/152; 348/153; 348/154; 348/155; 348/156; 348/157; 348/158; 348/159; 348/160; 348/161

(58) Field of Classification Search
CPC ......... H04N 7/181; H04N 7/183; H04N 7/18; H04N 7/188; H04N 5/235; G08B 13/19656; G08B 13/196
USPC ........................................................ 348/143
See application file for complete search history.

(56) References Cited

U.S. PATENT DOCUMENTS

| | | | |
|---|---|---|---|
| 4,816,854 A | 3/1989 | Tsuji et al. | |
| 5,019,845 A | 5/1991 | Asakuara et al. | |
| 5,042,915 A * | 8/1991 | Akutsu et al. | 359/230 |
| 5,528,333 A | 6/1996 | Lee | |
| 6,993,255 B2 | 1/2006 | Braun et al. | |
| 7,385,641 B2 | 6/2008 | Ito | |
| 7,461,948 B2 | 12/2008 | van Voorst Vader et al. | |
| 7,510,289 B2 | 3/2009 | Takekuma | |
| 7,529,478 B2 | 5/2009 | Cutler et al. | |
| 7,581,852 B2 | 9/2009 | Kennedy et al. | |
| 7,652,274 B2 | 1/2010 | Wernersson | |
| 7,679,649 B2 * | 3/2010 | Ralston et al. | 348/211.3 |
| 7,784,077 B2 * | 8/2010 | Fernandez | 725/86 |
| 7,805,404 B2 * | 9/2010 | Fernandez | 707/621 |
| 7,813,631 B2 | 10/2010 | Endo | |
| 7,841,731 B2 | 11/2010 | Marka et al. | |

(Continued)

FOREIGN PATENT DOCUMENTS

EP 2490439 A1 * 8/2012

OTHER PUBLICATIONS

Web page, http://www.raytechcctv.com, downloaded on Feb. 14, 2011.

(Continued)

*Primary Examiner* — Andy Rao
*Assistant Examiner* — Shan Elahi
(74) *Attorney, Agent, or Firm* — Marian J. Furst

(57) ABSTRACT

Zoom illumination system for use with closed circuit TV cameras in applications requiring long distance illumination, such as surveillance and night vision. The system includes multiple strings of LEDs, which may have additional lenses, with each LED string capable of providing illumination for a predetermined viewing angle. The LED strings can be switched on and off to provide illumination as desired.

30 Claims, 7 Drawing Sheets

(56) References Cited

U.S. PATENT DOCUMENTS

| | | |
|---|---|---|
| 7,850,338 B1 | 12/2010 | Messina et al. |
| 2002/0172039 A1* | 11/2002 | Inditsky .................. 362/231 |
| 2003/0038225 A1* | 2/2003 | Mulder et al. ............. 250/205 |
| 2003/0043027 A1* | 3/2003 | Carson et al. ........... 340/310.01 |
| 2003/0048641 A1* | 3/2003 | Alexanderson et al. ...... 362/470 |
| 2004/0108467 A1* | 6/2004 | Eurlings et al. .......... 250/492.1 |
| 2004/0111030 A1* | 6/2004 | Zeman ..................... 600/473 |
| 2005/0104958 A1* | 5/2005 | Egnal et al. ............... 348/143 |
| 2005/0125083 A1* | 6/2005 | Kiko ........................ 700/19 |
| 2005/0258942 A1* | 11/2005 | Manasseh et al. ........ 340/425.5 |
| 2006/0017841 A1* | 1/2006 | Farrell ..................... 348/373 |
| 2006/0085534 A1* | 4/2006 | Ralston et al. ............. 709/223 |
| 2006/0098729 A1* | 5/2006 | Shen .................... 375/240.01 |
| 2006/0122515 A1* | 6/2006 | Zeman et al. .............. 600/473 |
| 2006/0221181 A1* | 10/2006 | Garoutte ................... 348/143 |
| 2007/0013552 A1* | 1/2007 | Povey et al. ............... 340/907 |
| 2007/0035623 A1* | 2/2007 | Garoutte et al. ........... 348/143 |
| 2007/0052803 A1* | 3/2007 | Chosak et al. ............. 348/143 |
| 2007/0058717 A1* | 3/2007 | Chosak et al. .......... 375/240.08 |
| 2008/0104427 A1* | 5/2008 | Yee et al. .................. 713/300 |
| 2008/0174742 A1* | 7/2008 | Ito ........................... 353/31 |
| 2009/0261737 A1* | 10/2009 | Wright et al. .............. 315/154 |
| 2009/0272986 A1* | 11/2009 | Chan et al. ................. 257/88 |
| 2010/0005328 A1* | 1/2010 | Rakshani et al. ........... 713/322 |
| 2010/0045791 A1* | 2/2010 | Drive et al. ................ 348/143 |
| 2010/0085772 A1* | 4/2010 | Song et al. ................. 362/612 |
| 2010/0177184 A1* | 7/2010 | Berryhill et al. ............. 348/77 |
| 2011/0113453 A1* | 5/2011 | Ralston et al. ............... 725/62 |
| 2011/0169469 A1* | 7/2011 | Li et al. .................... 323/282 |
| 2012/0287621 A1* | 11/2012 | Lee et al. .................. 362/231 |
| 2013/0170212 A1* | 7/2013 | Cuda et al. .............. 362/249.02 |

OTHER PUBLICATIONS

Web page, http://www.boschsecurity.us/en-us/ProductInformation/Cameras/Illuminators/, downloaded on Feb. 14, 2011.

Web page, http://www.rainbowcctv.com, downloaded on Feb. 14, 2011.

* cited by examiner

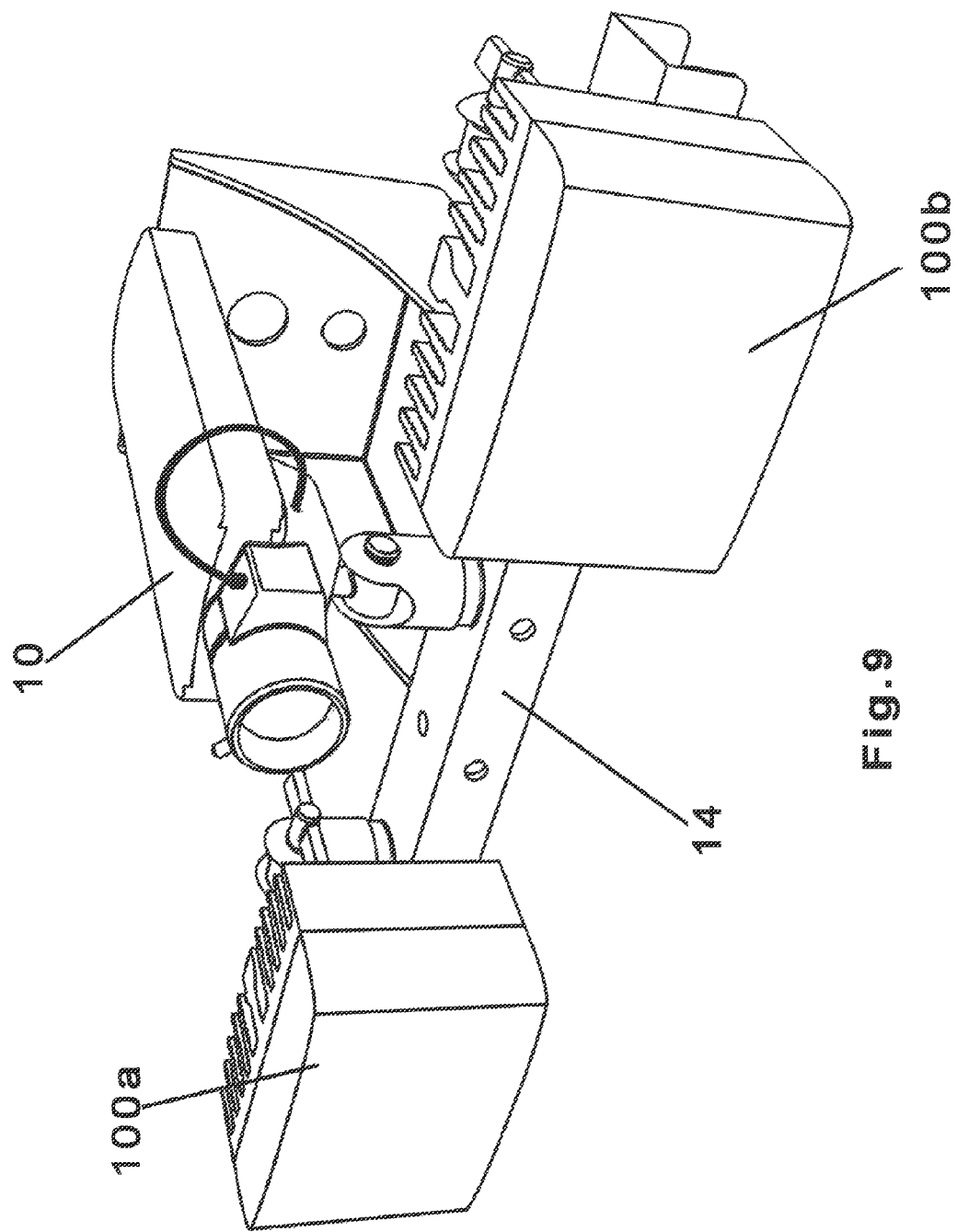

ZOOM ILLUMINATION SYSTEM

CROSS REFERENCE TO RELATED APPLICATIONS

This application claims the benefit of U.S. Provisional Patent Application Ser. No. 61/471,003 of Valdis and Dmitry Postovalov, filed on Apr. 1, 2011, entitled "Zoom Illumination System," which is included herein by reference in its entirety.

FIELD OF THE INVENTION

The present invention relates generally to an illumination system for use with closed circuit TV cameras, and more particularly to a zoom illumination system for use with closed circuit TV cameras in applications requiring long distance illumination.

BACKGROUND OF THE INVENTION

Closed circuit television (CCTV) systems are commonly used for video surveillance operations, such as for security applications and night vision. Traditional CCTV cameras operate mainly with the visible light spectrum and are blind in conditions of darkness, such as during the night or in enclosed spaces within buildings. CCTV cameras are available that can operate with either the visible light spectrum or infrared spectrum. It is often desirable to be able to zoom in on areas with suspicious or interesting activity, and CCTV cameras may include pan-tilt-zoom (PTZ) features to allow viewing of particular areas of interest. Illuminators are frequently used to provide visible and/or infrared light that is sufficient for wide-angle views, typically with a viewing angle of 120-140 degrees. However, these illuminators generally do not provide sufficient light for narrow angle long-range viewing.

Traditional zoom lenses for CCTV cameras are relatively large and motorized. Thus, they are bulky as well as mechanically and electronically complex. Particularly for applications where the camera is located outdoors, maintaining proper mechanical operation under severe weather conditions can be difficult. In recent years, digital zoom technology has been developed, allowing selection of portions of a wide-angle image for more detailed viewing. Digital zoom technology is accomplished via processing of the image received from a camera, requiring neither complex electronics nor complex mechanical systems within the camera. The images can be processed at a remote location.

Thus, there is a need for an illumination system that provides sufficient illumination for use with zoom features in CCTV cameras, particularly for digital zoom features.

There is also a need for a zoom illumination system that operates without moving parts.

There is a further need for a zoom illumination system that is energy-efficient.

SUMMARY OF THE INVENTION

According to a first aspect of the present invention there is provided an illuminator comprising: first and second light sources configured to emit radiation over first and second angles of view respectively; power supply means configured to supply power to said first and second light sources; and switching means operable by a user when the device is in use to interchangeably direct power from said power supply means to: a) said first light source; or b) said second light source. Said first angle of view may be wider than said second angle of view In one embodiment the first light source and/or the second light source may each comprise at least one light emitting diode (LED). The first light source may comprise a plurality of LEDs that are substantially arranged in a line or other geometric configuration. The second light source may also comprise a plurality of LEDs that may also or alternatively be substantially arranged in a line or other geometric configuration.

In one embodiment the first light source may comprise a first lens arrangement and/or the second light source may comprise a second lens arrangement. One or more of the LEDs comprising the first light source and/or one or more of the LEDs comprising the second light source; may be configured to direct radiation through a lens. One or more of the LEDs comprising the first light source and/or one or more of the LEDs comprising the second light source: a) may be in physical contact with a lens; b) may have a lens built thereinto; c) may have a lens mounted thereto; and/or d) may have a lens mounted adjacent thereto.

In one embodiment the LED(s) comprising the first light source and the LED(s) comprising the second light source, are configured to generate radiation of at least substantially the same wavelength. In an alternative embodiment the LED (s) comprising the first light source and the LED(s) comprising the second light source; are configured to generate radiation of different wavelengths.

In one embodiment the power supply means is coupled to at least one sensor, said at least one sensor being configured to activate and/or deactivate the power supply means upon detection of a predefined condition. Such a sensor may comprise an ambient light sensor, a motion detector, an alarm, or a thermal sensor. In one embodiment the device may comprise any combination of such sensors.

In another embodiment the power supply means may be configured to transfer power from a source of electricity to said switching means. The power supply means may be configured to transfer power from an AC power source, a DC power source, an internet protocol power over ethernet source, a battery, a solar panel, or any combination thereof. In one embodiment the power supply means may be configured to produce a regulated power supply from a supply of electricity. The power supply means may be configured to transfer such a regulated power supply to said switching means.

In another embodiment a circuit board may be coupled to the first light source and/or the second light source and/or the power supply means and/or the switching means. In one particular embodiment the first light source, the second light source, the power supply means, and the switching means may be coupled to the same circuit board. In an alternative embodiment the first light source, the second light source, the power supply means, and the switching means may be coupled to different circuit boards. Each circuit board may be coupled mechanically to a housing using suitable fasteners, an adhesive, or combinations thereof for example. Such an adhesive may be thermally conductive and electrically insulating.

In one embodiment the housing may be a heat sink. The heat sink may comprise one or more protrusions such as a fin (or fins) for dissipating heat. The heat sink may comprise a metal (such as aluminum) or a thermally conducting plastic. In one embodiment the device may also comprise a light transmissive cover for covering each circuit board and at least some the components coupled thereto. In such an embodiment the first and second light sources may be configured to generate radiation which is capable of passing through the cover.

According to a second aspect of the present invention there is provided an illuminator comprising: at least two light sources, each said light source being configured to emit radiation over a different angle of view; power supply means configured to supply power to said at least two light sources; and switching means operable by a user when the device is in use to interchangeably direct power from said power supply means to either one of said at least two light sources.

In one embodiment the device comprises: a first light source having an angle of view of substantially 120 degrees; a second light source having an angle of view of substantially 30 degrees; and a third light source having an angle of view of substantially 5 degrees. The first, second and third light sources may each comprise two LEDs. Each LED may be configured to generate radiation having a wavelength of substantially 850 nm or substantially 940 nm. The switching means may be operable by a user while the device is in use to interchangeably direct power from said power supply means to: a) said first light source; b) said second light source; or c) said third light source.

According to a third aspect of the present invention there is provided a monitoring system comprising a camera and at least one illuminator according to any of the foregoing arrangements.

In one embodiment the camera and said illuminator(s) may be coupled to one another. In another embodiment the camera and said illuminator(s) may be positioned or arranged adjacent one another. The illuminator(s) and the camera may be coupled via one or more mechanical linkages such that when the camera is moved said illuminator(s) is(are) moved by a corresponding amount and vice versa.

The monitoring system may comprise a first illuminator configured to generate radiation having a first wavelength, and a second illuminator configured to generate radiation having a second wavelength. The monitoring system may alternatively comprise first and second illuminators which are configured to generate radiation of at least substantially the same wavelengths.

In one embodiment the camera may comprise a video camera, and the monitoring system may comprise a CCTV system.

According to a fourth aspect of the present invention there is provided a method of assembling an illuminator, the method comprising the steps of: providing at least one circuit board; coupling a first light source to at least one said circuit board, said first light source being configured to illuminate radiation over a first angle of view; coupling a second light source to at least one said circuit board, said second light source being configured to illuminate radiation over a second angle of view which is narrower than said first angle of view; coupling power supply means to at least one said circuit board such that said power supply means is able to supply power to said first and second light sources; and coupling switching means to at least one said circuit board such that when the device is in use said switching means is operable by a user to interchangeably direct power from said power supply means to: a) said first light source; or b) said second light source.

In one embodiment the first light source, the second light source, the power supply means, and the switching means may be coupled to the same circuit board. In another embodiment the first light source, the second light source, the power supply means, and the switching means may be coupled to different circuit boards. The method may also comprise the step of electrically coupling the different circuit boards, and thereby the respective component(s) coupled thereto.

In one embodiment the method further comprises the step of coupling the circuit board(s) to a heat sink. The circuit board(s) may be coupled to the heat sink using a gap filler material that is thermally conductive yet electrically insulating, fasteners, an adhesive, or combinations thereof. Such an adhesive may be thermally conductive and electrically insulating. In another embodiment the method may comprise the step of covering some or all of the circuit boards and the components coupled thereto.

In one embodiment, the method may comprise the step of coupling the illuminator to a camera. In another embodiment, the method may comprise the step of positioning the illuminator adjacent a camera. The method may include the step of coupling the illuminator and the camera to one another via a mechanical linkage such that when the camera is moved the illuminator is able to be moved by a corresponding amount and vice versa.

A yet further embodiment provides an illumination system comprising a plurality of radiation sources each operable to emit radiation over a different field of view, and control means operable to select and operate a said radiation source to emit radiation over the associated field of view.

BRIEF DESCRIPTION OF THE DRAWINGS

These and other features, aspects, and advantages of embodiments of the present invention will become better understood with reference to the following description, appended claims, and accompanying drawings, where:

FIG. 9 is a schematic perspective view of another embodiment of the present invention with two zoom illuminators.

DESCRIPTION OF THE PREFERRED EMBODIMENTS

With the issues defined above in mind, one presently preferred embodiment comprises a zoom illumination system. The system does not require use of a zoom lens, and it does not require moving parts. The system may be used with digital and mechanical zoom processing or CCTV images to provide a zoom system with no moving parts.

As used herein, the term "illuminator" refers to an illumination device comprising one or more light sources, a power supply, and a controller or switch. As used herein, the term "light source" refers to one or more electrically coupled light emitters, for example a string of LEDs.

Figure 1:
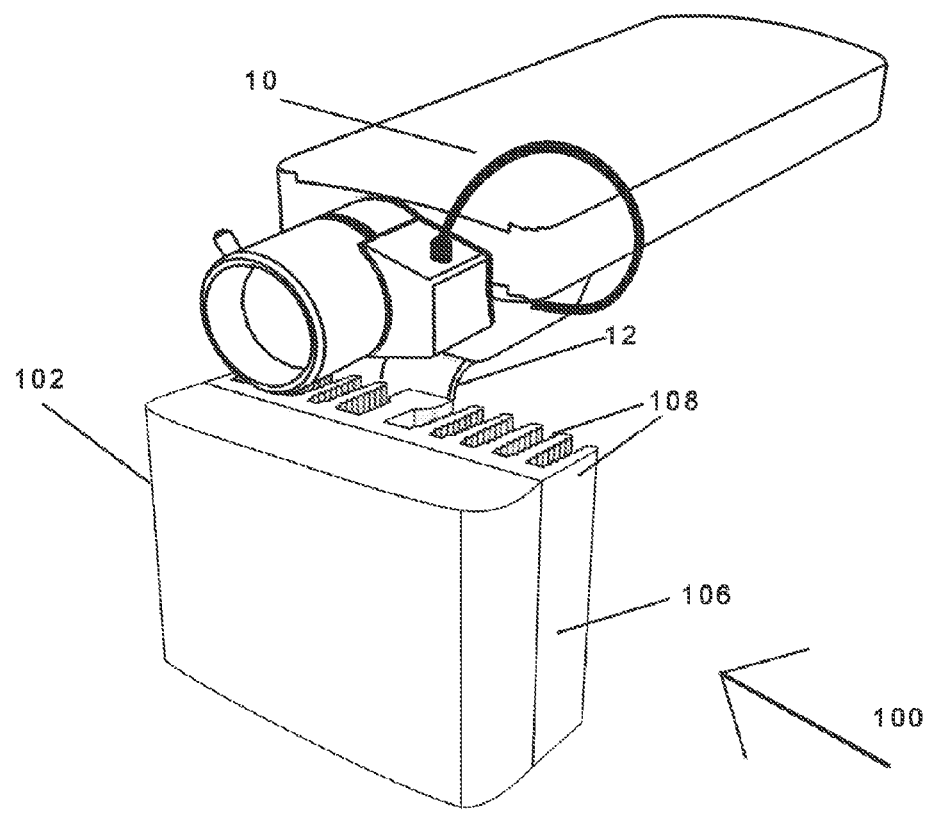
FIG. 1 is a schematic perspective view of a CCTV camera and one embodiment of a zoom illuminator.
Figure 2:
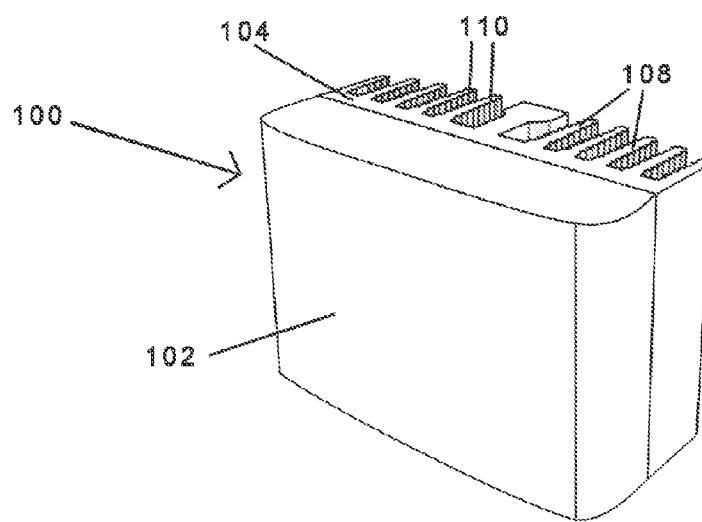
FIG. 2 is a schematic perspective view of the zoom illuminator of FIG. 1.

As shown in FIGS. 1-2, zoom illuminator 100 is mounted adjacent a camera 10, for example a CCTV camera, onto a support structure 12, in a manner that illuminator 100 and camera 10 can be moved together as a unit, such as for panning and tilting. In another embodiment, however, the camera 10 may be mounted to a support structure which extends from the illuminator 100. In both cases, camera 10 is able to record and/or transmit images, such as digital video images, to a viewing facility, which may be located remotely from the camera. Illuminator 100 includes a cover 102 that is mounted onto a base 104 and in one arrangement a weatherproof seal is formed between the cover 102 and the base 104 to protect the components mounted on base 104. Cover 102 is light transmissive at the wavelengths used in illuminator 100. Base 104 preferably comprises a thermally conductive outer portion 106 and may have one or more protrusions, such as fins 108 extending therefrom. Outer portion 106 functions as a heat sink for dissipation of heat generated by the system electronics, prolonging the life of the electronics, particularly the LEDs. Preferably, fins 108 have features 110 that increase the surface area to maximize heat radiation. The face of base 104 opposing the fins 108 is covered with a layer 112 of a gap filler material that is preferably thermally conductive yet electrically insulating. A circuit board, such as printed circuit board (PCB) 114, equipped with LED lights and control circuitry, is mounted onto the base 104 via thermally conductive gap filler 112, with the LED lights oriented in a manner that allows light transmission through cover 102. Alternatively, one or more different types of light sources could be used. Preferably, at least one of the fins 108 is sufficiently wide to accommodate a means for mounting the illuminator onto a suitable structure, such as a pole or bracket. The mounting means may include a standard tripod mount such as is widely used with photographic and video equipment.

Figure 3:
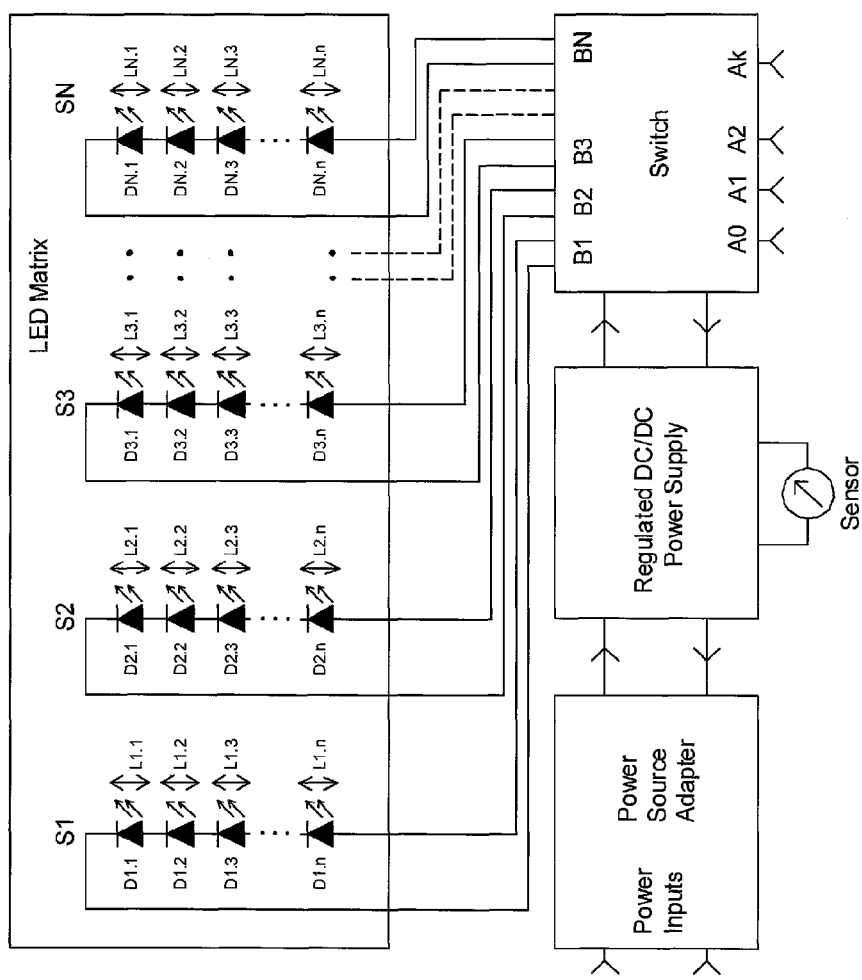
FIG. 3 is a block diagram of the electronics of the zoom illuminator of FIG. 1.

The components include a power source adapter 120, a regulated DC/DC power supply 130, a switching device 140, and an arrangement of LEDs, such as a matrix of LEDs, with associated electrical connections, shown schematically in FIG. 3 Preferably, the components are mounted onto a printed circuit board that includes the electrical connections.

Figure 4:
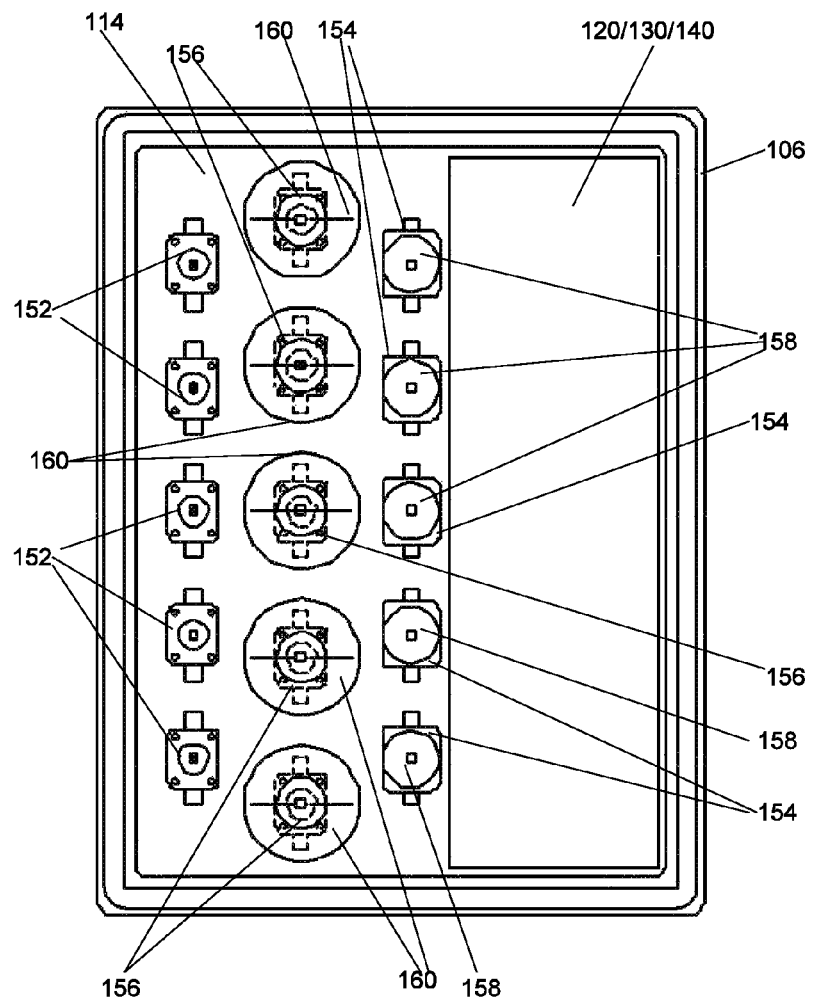
FIG. 4 is a schematic top view of the zoom illuminator of FIG. 1 with the cover removed.

Referring to FIGS. 3 and 4, power source adapter 120 converts the input voltage to the DC voltage required by the regulated DC/DC power supply 130. The input power can be provided by any available source, such as an AC source, a DC source, an internet protocol power over ethernet (IP PoE) source, a battery, or a solar panel, among others, for example. Types of power sources commonly used in the security industry include 12 V DC, 24 V AC, batteries, and PoE. Some applications include use from automobiles, requiring mounting of the CCTV and illumination system in or on the vehicle. The automotive industry standard requires 9-16 V DC compatibility. The use of IP PoE can significantly reduce system costs, particularly installation costs. The system can be used with any of these types of power sources, either DC or AC, with a wide range of voltage between a few volts to several hundred volts. A bridge rectifier may be used to convert AC into DC and to transfer DC voltage to the regulated DC/DC power supply 130.

Regulated DC/DC power supply 130 provides the required voltage and current for proper operation of the LEDs in LED matrix 150. Any input voltage range may be used. Depending on the desired power output and the number of LEDs in matrix 140, the input and output voltage may range from a few V to a few hundred V. Voltages between about 1.5 and about 3 V are preferred for some embodiments. It should be noted that the use of large numbers of LEDs in series requires high voltage output from the power supply 130 and therefore may require specially certified electricians for installation. Typically, no special certifications are required for installation of low voltage systems operating with 24 V AC or less.

The DC output may be regulated to provide a constant current or constant voltage for powering LEDs. Preferably, an adjustable constant current buck regulator may be used with an input voltage range between about 9 and about 36 V DC. Alternatively, the DC output may be regulated to provide a constant voltage. Preferably power supply 130 may provide appropriate voltage for the desired application, such as with linear, buck, boost, buck-boost, SEPIC (single ended primary inducted converter), flyback, or combinations thereof.

One or more sensors 132 may be provided in electrical communication with power supply 130 for enabling and disabling the power supply. Any type of suitable sensor may be used, depending on the desired application for the CCTV system. Examples of types of sensors include ambient light sensors (ALSs), motion detectors, alarms, and thermal sensors. It is envisaged that combinations of the same or different types of sensors may be used. For example, a built-in ALS may be used in combination with a thermal sensor for protection from device overheating. There may be separate inputs for one or more external or remote sensors.

As shown schematically in FIG. 3, the switch is used to turn pre-arranged strings or groups of LEDs D1.1 to D1.n, D2.1 to D2.n, D3.1 to D3.n, and DN.1 to DN.n on and off or to increase and decrease the intensity of radiation output from the LEDs. Each string of LEDS may be provided with lenses L1.1 to L1.n, L2.1 to L2.n, L3.1 to L3.n and LN.1 to LN.n, respectively. In other arrangements it is envisaged that only one or some of the strings of LEDs are provided with lenses. It is also envisaged that only one or some of the LEDs in any particular string of LEDs are provided with lenses. Any suitable type of switch may be used, including mechanical toggle and rotary switches, electro-mechanical switches incorporating different types of electro-magnetic relays, electronic switches, and combinations thereof. Inputs A0, A1, A2, ... Ak are required for electronic switches, where k is the number of bits. The number of outputs B1, B2, B3, ... BN is determined by the number of LED strings or groups 144. For example, with 2 bits input, 3 outputs will be available, and with 3 bits input, 7 outputs will be available, and with 4 bits input, 15 outputs will be available. 8 bits provide up to 255 outputs, allowing incremental zoom steps that appear to be continuous. Preferably, three outputs are available, with either a manual toggle switch or an electronic switch. An electronic switch is preferable for 3 and more bit versions, because it requires only 4 wires, while mechanical and electromechanical switches require 8 wires. Alternatively, a user may select a desired beam angle and use a jumper instead of a switch. With a jumper, the user cannot easily switch back and forth between different zoom steps. For illustrative applications, such as surveillance systems, it is not necessary to provide continuous zoom as is used in conventional photography. It is sufficient to provide incremental zoom steps, which can be accomplished without moving parts in the zoom system. The number of steps can be selected to provide the desired increments.

For many contemplated uses of the invention, switch 140 may be operated manually by a person monitoring the surveillance video. The switch with its electrical contacts is located in proximity to the LEDs, and the switch controller, for example, a handle, knob, push button, etc., may be located remotely, for example, in proximity to the camera or the operator. Alternatively, an automated system could operate switch 140, such as with a mechanism tied to a camera zoom lens or heat or motion detectors for example. Any desired protocol can be used for transmitting signals to the switch 140 in the illuminator, for example, RS485, Ethernet, or a manufacturer's proprietary protocol.

Figure 5:
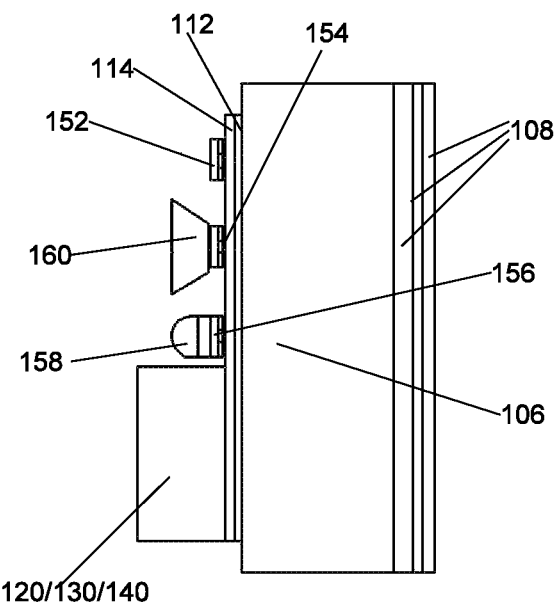
FIG. 5 is a schematic side view of the zoom illuminator of FIG. 1, from the top of the view of FIG. 4.
Figure 6:
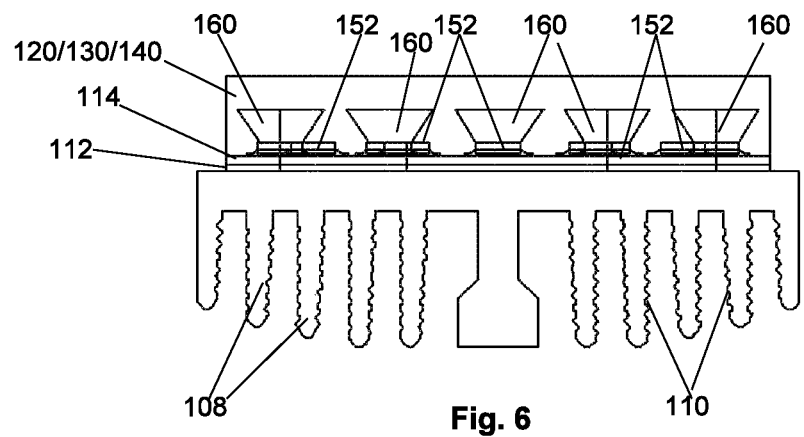
FIG. 6 is a schematic side view of the zoom illuminator of FIG. 1, from the left side of the view of FIG. 4.

As shown in FIGS. 4-6, strings or groups of LEDs 152, 154, and 156, at least some LEDs of which may include additional external lenses, are mounted onto PCB 114, and additional external lenses may be mounted onto LEDs and/or PCB 114. Any suitable type of LED may be used, including through hole package (T/H) and surface mount technology (SMT) LEDs, providing light in any desired portion of the spectrum, for example infrared, visible, or both. If multiple portions of the spectrum, for example infrared and visible are desired, different LED strings within a single array on a single PCB may be used, or there may be separate arrays of LEDs on either the same or different PCBs. The number of LEDs is sufficient to provide the desired amount of light, depending on the application, including the selected topology and input voltage. The output light intensity is proportional to the number of LEDs and their forward current. Any number of strings or groups of LEDs 152, 154, and 156 may be used, depending on the application and the required zoom step. Strings of 5 1-amp SMT LEDs, along with buck DC-DC power supply, have been found suitable for long-distance illumination and provide power efficient solution coverage.

Figure 7:
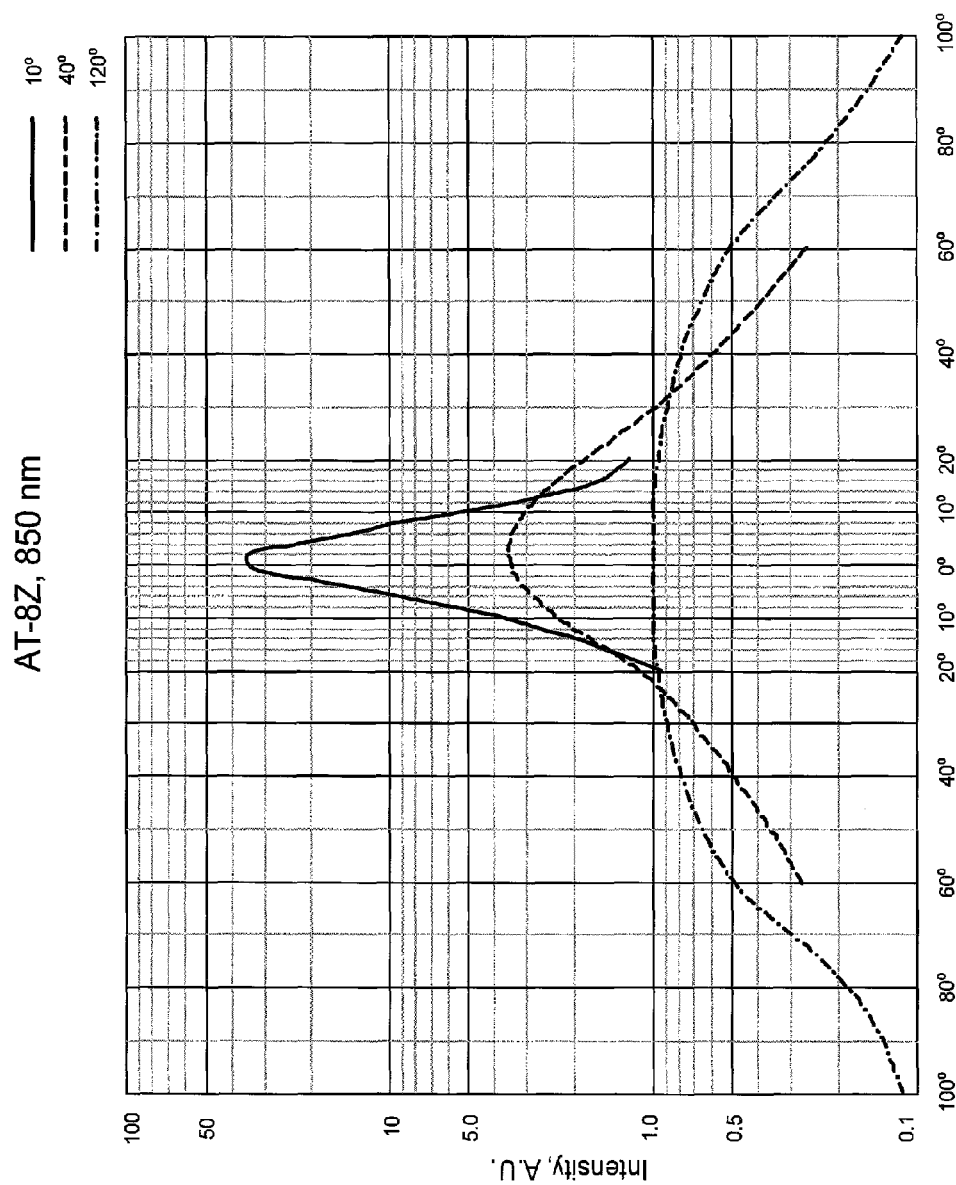
FIG. 7 is a graph of light intensity as a function of illumination angle at 850 nm.
Figure 8:
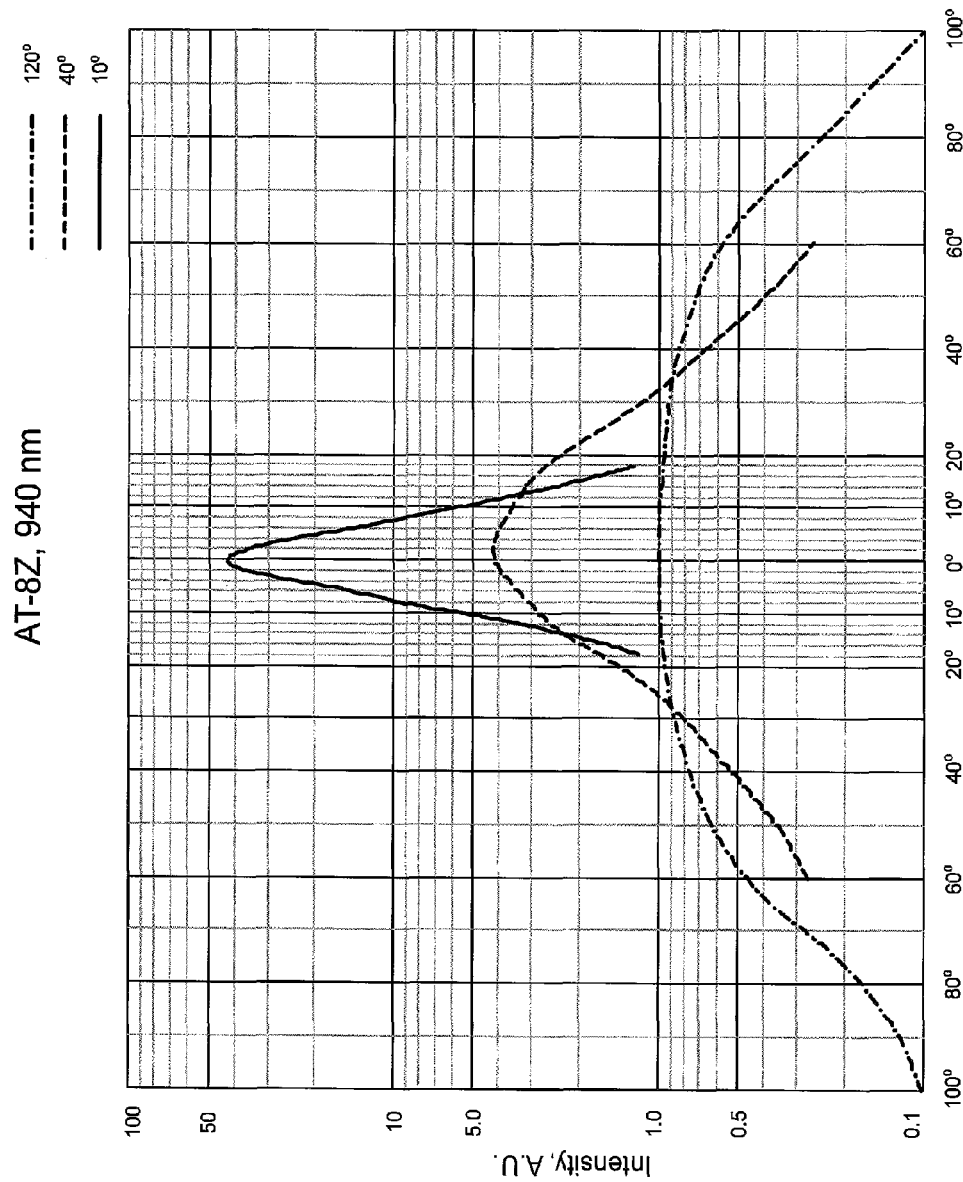
FIG. 8 is a graph of light intensity as a function of illumination angle at 940 nm.

Each LED string or group 152, 154, and 156 in the matrix is used to provide illumination for a different viewing angle, also called the angle of view, based on the desired zoom for viewing. The beam angle may be symmetrical, elliptical, or have any other desired shape, covering angles ranging from a few degrees to 130 degrees or more. The beam shape can be controlled with the use of appropriate lenses. Depending on the desired viewing angle, built-in or external lenses may be used for each string or group of LEDs. For example, a wide viewing angle of about 130 degrees (full width at half maximum) can be achieved with no additional lens(es), such as with LEDs 152. A somewhat narrower angle of view can be achieved with built-in lens(es), such as with lenses 158 on LEDs 154, and an even narrower angle of view can be achieved with an external lens, such as with lenses 160 on LEDs 156. If external, the lens or lenses can each be coupled to a single LED, or a lens matrix can be coupled to the group of LEDs. The latter arrangement may be used, for example, with Fresnel lenses. FIGS. 7 and 8 show the light intensity at 850 nm and 940 nm, respectively, as a function of illumination angles of 120 degrees, 40 degrees, and 10 degrees, using 5 LEDs for each angle. The light intensity profiles are very similar, demonstrating that a desired profile can be obtained over a wide range of wavelengths. These angles are representative of angles of view, and other angles, smaller and larger, can be used.

The LED string or group with associated lenses, if any such lenses are provided, can be selected via switch 140 to provide a desired viewing angle; the LEDs and associated viewing angles can be changed by switching the strings of LEDs on or off. I.e., for wide angle viewing, LED string 152 is turned on and strings 154 and 156 are turned off. To zoom in for an intermediate viewing angle, strings 152 and 156 are turned off and string 154 is turned on. To zoom in for a narrow viewing angle, strings 152 and 154 are turned off and string 156 is turned on. Setting the number of strings and lens angle allows setting of zoom steps, with a smaller number of strings providing coarse steps and a larger number of strings providing smoother steps. The amount of zoom can be linear or non-linear, as desired for a specific application. As shown in FIGS. 4 and 6, the LED strings are in a linear arrangement. Any desired geometric arrangement may be used, for example circles, rectangles, or triangles.

Depending upon the configuration of LEDs, and the power supplied to them, illumination can be provided for long distance ranges. For example, using a 12 V power input, an angle of view of about 10 degrees can be illuminated brightly enough for use with a suitable camera over distances up to about 410 feet, and an angle of view of about 90 degrees can be illuminated brightly enough for use with a suitable camera over distances of 120 feet or more. With higher voltage, such as 24-36 V DC or 24 V AC, an angle of view of about 10 degrees can be illuminated for a distance up to about 630 feet, and an angle of view of about 130 degrees can be illuminated for a distance up to about 114 feet.

It may be desirable to combine two or more illuminators 100 with a single camera to provide greater light intensity, more zoom steps, and/or beam shaping. For example, FIG. 9 shows a camera 10 and two illuminators 100a and 100b mounted onto a support 14. One illuminator 100a or 100b might be used to provide radiation having a first wavelength, for example visible light, while the other illuminator might be used to provide radiation having a second wavelength, for example infrared light. Alternatively, both illuminators could be used to provide more light by providing radiation of at least substantially the same wavelength.

The zoom illuminator can be manufactured by preparing a circuit board, such as a printed circuit board, for installation of the desired electronic devices, including the power source adapter, regulated power supply, switch, and LED arrangement. Preferably the board may be a surface mount device (SMD). The desired modules are coupled to the board by mounting them onto the board. The board is then mounted onto the heat sink, with a fill gap containing a material which is preferably electrically insulating but thermally conductive. The heat sink can be formed from any suitable heat conductive material using any manufacturing method. For example, a suitable heat sink can be formed by extruding metal, such as aluminum, with the desired profile or by injection molding a thermally conductive plastic. The cover is attached to the base, and the unit is then mounted in proximity to or remotely from a camera, using any suitable mounting mechanism. The system is then ready to be turned on and used, such as by an operator viewing an area and operating a switch to select the desired zoom, or automatically.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to which fall within the spirit and the scope of the present invention. It should also be noted that while particular combinations of features have been disclosed herein, the scope of the present invention is not limited to the particular combinations that have been explicitly enumerated herein, but instead extends to encompass any combination of features herein disclosed.

LIST OF CALLOUTS camera 10
support 12 (FIG. 1)
support 14 (FIG. 7)
zoom illuminator 100
cover 102
base 104
heat-conductive outer portion 106
fins 108
fin features 110
layer 112, heat conductive yet electrically insulating
PCB 114
power source adapter 120 regulated DC/DC power supply 130
sensor 132
switching device 140
LED matrix 150
LEDs 152 (wide angle)
LEDs 154 (medium mangle)
LEDs 156 (narrow angle)
lenses 158 on LEDs 154
lenses 160 on LEDs 156

What is claimed is:

1. An illuminator for a zoom illumination system, said illuminator comprising:
    a plurality of light sources comprising LEDs, said light sources selected from visible light sources, infrared light sources, and combinations thereof, said light sources positioned geometrically and connected electrically to provide illumination for a plurality of preselected different angles of view;
    a regulated DC/DC power supply for said light sources;
    a power source adapter for converting input voltage to DC voltage usable by said power supply;
    a switch that interchangeably directs power from said power supply to selected ones of said light sources to illuminate a selected one of said angles of view.

2. The illuminator of claim 1, wherein said power source adapter is operative to convert input voltage selected from 12 V DC, 24 V AC, batteries, internet protocol power over ethernet (IP PoE), and combinations thereof.

3. The illuminator of claim 1, wherein said power supply is operative to use input voltages between about 1 V and about 500 V and selected from AC and DC, and output voltages between about 1 V DC and about 500 V DC.

4. The illuminator of claim 1, wherein said power supply is operative to use input voltages between about 9 V DC and about 36 V DC.

5. The illuminator of claim 1, further comprising a housing for providing a water-proof enclosure for said light sources, wherein said housing is transmissive for light at wavelengths provided by said light sources.

6. The illuminator of claim 1, wherein said LEDs are mounted onto at least one circuit board.

7. The illuminator of claim 6, further comprising a heat sink thermally coupled to each circuit board.

8. The illuminator of claim 1, wherein said LEDs are divided into groups, with the LEDs in each group in electrical communication with each other and arranged geometrically to provide illumination for one of said preselected angles of view.

9. The illuminator of claim 8, further comprising at least one lens, said at least one lens selected from external lenses coupled to single LEDS, built-in lenses coupled to single LEDs, lens matrices coupled to groups of LEDs, and combinations thereof.

10. The illuminator of claim 8, wherein each group of LEDs is operative to provide light at one wavelength, and different groups provide light at different wavelengths.

11. The illuminator of claim 1, wherein said illuminator is operative to provide illumination for viewing objects at distances greater than or equal to 100 feet.

12. The illuminator of claim 1, wherein said illuminator is operative to provide illumination for viewing objects at distances greater than or equal to 400 feet.

13. The illuminator of claim 1, wherein said illuminator is operative to provide illumination for viewing objects at distances greater than or equal to 600 feet.

14. The illuminator of claim 1, wherein said illuminator is operative to provide illumination for viewing objects at distances of about 100 feet.

15. The illuminator of claim 1, wherein said illuminator is operative to provide illumination for viewing objects at distances of about 400 feet.

16. The illuminator of claim 1, wherein said illuminator is operative to provide illumination for viewing objects at distances of about 600 feet.

17. A zoom illumination system comprising:
    an illuminator, comprising a plurality of light sources comprising LEDs, said light sources selected to provide illumination at wavelengths selected from visible wavelengths, infrared wavelengths, and combinations thereof, said light sources positioned geometrically and connected electrically to provide illumination for a plurality of preselected different angles of view;
    a camera operative to record images at the wavelengths provided by said light sources; and
    control means for operating said illuminator to provide illumination for said camera, said control means comprising:
        a regulated DC/DC power supply for said light sources;
        a power source adapter for converting input voltage to DC voltage usable by said power supply; and
        a switch that interchangeably directs power from said power supply to selected ones of said light sources to illuminate a selected one of said angles of view.

18. The illumination system of claim 17, wherein said camera is a CCTV camera.

19. The illumination system of claim 17, further comprising a digital zoom processor.

20. The illumination system of claim 17, wherein said system consists essentially of non-moving parts.

21. The illumination system of claim 17, wherein said system is a surveillance system.

22. The illumination system of claim 17, comprising a plurality of illuminators, with each illuminator comprising a plurality of light sources comprising LEDs, said light sources positioned geometrically and connected electrically to provide illumination for a plurality of preselected different angles of view.

23. The illumination system of claim 17, wherein said illuminator and said camera are mechanically coupled.

24. The illumination system of claim 17, wherein said illuminator is operative to provide illumination for said camera at distances greater than or equal to 400 feet within at least one angle of view.

25. The illumination system of claim 17, wherein said illuminator is operative to provide illumination for said camera at distances greater than or equal to 100 feet within at least one angle of view.

26. The illumination system of claim 17, wherein said illuminator is operative to provide illumination for said camera at distances greater than or equal to 600 feet within at least one angle of view.

27. The illumination system of claim 17, comprising a plurality of illuminators, wherein each of said illuminators is positioned geometrically and connected electrically to provide illumination for different preselected angles of view.

28. The illumination system of claim 17, wherein said illuminator is operative to provide illumination for said camera at distances of about 100 feet within at least one angle of view.

29. The illumination system of claim 17, wherein said illuminator is operative to provide illumination for said camera at distances of about 400 feet within at least one angle of view.

30. The illumination system of claim 17, wherein said illuminator is operative to provide illumination for said camera at distances of about 600 feet within at least one angle of view.

\* \* \* \* \*